(12) United States Patent
Hayashi

(10) Patent No.: US 6,839,317 B2
(45) Date of Patent: Jan. 4, 2005

(54) RECORDING INFORMATION REPRODUCING APPARATUS

(75) Inventor: Hideki Hayashi, Tsurugashima (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 10/725,702

(22) Filed: Dec. 2, 2003

(65) Prior Publication Data

US 2004/0109404 A1 Jun. 10, 2004

Related U.S. Application Data

(62) Division of application No. 09/425,470, filed on Oct. 22, 1999, now Pat. No. 6,690,629.

(30) Foreign Application Priority Data

Oct. 23, 1998 (JP) ............................................. 10-302292

(51) Int. Cl.[7] ................................................. G11B 7/24
(52) U.S. Cl. ................................. 369/275.4; 369/275.3
(58) Field of Search ................................ 369/47.37, 92, 369/93, 121, 124.08, 124.02, 275.3, 275.4

(56) References Cited

U.S. PATENT DOCUMENTS

| | | | | |
|---|---|---|---|---|
| 5,281,797 A | * | 1/1994 | Tatsuno et al. | 250/201.5 |
| 5,430,700 A | * | 7/1995 | Kuribayashi et al. | 369/44.37 |
| 5,774,439 A | * | 6/1998 | Aoki et al. | 369/53.29 |

* cited by examiner

Primary Examiner—Paul W. Huber
(74) Attorney, Agent, or Firm—Perman & Green, LLP

(57) ABSTRACT

A recording information reproducing apparatus is disclosed for performing a searching operation. The recording information reproducing apparatus according to the invention is for reproducing recording information from a recording disc on which information data has been divided and recorded into a plurality of concentric zones. The apparatus selects a suitable one of a tracking servo by a sampled servo system and a tracking servo by a continuous servo system in accordance with a zone for reading information data.

5 Claims, 8 Drawing Sheets

RECORDING INFORMATION REPRODUCING APPARATUS

CROSS-REFERENCE TO RELATED APPLICATIONS

This application is a divisional of and claims priority from the U.S. patent application Ser. No. 09/425,470, filed on Oct. 22, 1999, now U.S. Pat. No. 6,690,629.

BACKGROUND OF THE INVENTION

1. Field of the Invention

This invention relates to an apparatus for reproducing recording information data from a recording disc.

2. Related Background Art

Well known recording formats for recording information data onto a recording disc such as an optical recording medium include such systems as CAV (Constant Angular Velocity), CLV (Constant Linear Velocity), ZCAV (Zoned CAV), and ZCLV (Zoned CLV). In the ZCLV system, CAV zones and transition zones are concentrically alternately arranged in one recording disc. In the CAV zone, the recording and reproduction are performed by setting a rotational angular velocity of the disc to be constant, while in the transition zone, the recording and reproduction are performed with the rotational angular velocity of the disc changing.

Japanese patent Kokai No. 7-114733 (designated as "JPA '733-hereinafter) discloses a recording disc using both the sampled servo system and the ZCLV system.

FIG. 1 is a plan view showing a recording surface of the recording disc disclosed in JPA '733.

As shown in FIG. 1, the recording disc comprises an annular recording area 20 including a spiral (or a plurality of concentric) recording track(s) 10 with information signals including a sync signal. In the recording area 20, a zone 21 as a CAV zone, and a boundary area 33 as a transition zone are concentrically alternately formed. A width of track pitch d1 of the boundary area 33 is larger than a track pitch d2 in the zone 21. Servo areas 31a shown by circles in FIG. 1 are intermittently formed on the recording track 10 so that a sampled servo tracking system applies a tracking servo. Further, as shown in FIG. 1, the servo areas 31a are formed in each zone 21 so as to be aligned in the same disc radial direction.

FIG. 2 is a diagram showing a recording format used in the servo area 31a.

The servo area 31a comprises: a pair of wobble pits 50 for a tracking servo; a mirror surface portion 51 for synchronization and a focusing servo; and clock pits 52 for clock reproduction. Each pair of wobble pits is arranged so as to be deviated in the disc radial direction by an equal distance around the track center. The wobble pit pairs are arranged in a manner such that the wobble pit pair of the odd-number track and the wobble pit pair of the even-number track are deviated in the track direction, respectively. In the tracking servo of the sampled servo system, the position in the disc radial direction of the pickup is controlled so that levels of reproduction signals of the pair of wobble pits are equal.

In the recording disc, a recording density is increased by narrowing the track pitch d2. In the disc, since the wobble pit pair of the odd-number track and the wobble pit pair of the even-number track are arranged so as to be deviated in the track direction as mentioned above, an unnecessary interference by the wobble pits of the adjacent tracks does not occur, even if the track pitch d2 is narrowed. Since the rotational angular velocity of the disc changes in the boundary area 33, however, it is impossible to align the servo areas 31a in the same disc radial direction. If the track pitch d1 is narrowed in a manner similar to d2, therefore, the reproduction signal is subjected to the unnecessary interference by the adjacent tracks. Therefore, the stable tracking servo is not performed. Thus, in the recording disc, the track pitch d1 in the boundary area 33 is set to be larger than d2 so as not to cause the unnecessary interference by the adjacent tracks.

The following problems arise when the recording information is reproduced from the recording disc. When the reproducing apparatus performs the searching operation after completion of the jumping operation of the pickup, the mirror surface portion 51 is first detected and the synchronization and focusing servo are established. Subsequently, the wobble pits are detected, the tracking servo is performed, the clock pits are detected, and the clock reproduction is performed. That is, it is necessary to first detect the mirror surface portion 51 to re-activate the reproducing apparatus after completion of the jumping operation of the pickup. If a jump destination of the pickup is the boundary area 33, it is not guaranteed that the mirror surface portion 51 can be positively detected, since the servo areas 31a are not aligned. Since it takes more time to re-activate the reproducing apparatus than necessary or the re-activation fails, a case may occur where the searching operation becomes unstable. Even when the boundary area 33 is jumped and searched, in the case where the pickup jumps over a portion other than the servo areas 31a, a tracking error cannot be detected, so that the count number of the track jump is incorrect, and search time increases.

OBJECTS AND SUMMARY OF THE INVENTION

The invention is made in order to solve the above problems. An object of the invention is to provide a recording information reproducing apparatus which can perform a preferable searching operation.

One aspect of the invention features an apparatus for reproducing recording information data from a recording disc on which information data has been divided and recorded into a plurality of concentric zones, said apparatus comprising: reading means for reading recording information data from a recording disc; and tracking servo means for selecting one of a tracking servo control by a sampled servo system and a tracking servo control by a continuous servo system in accordance with a zone being read by said reading means to control the selected tracking servo system.

As described above, according to the invention, even if a track jump destination at the time of search is in a transition area, the control mode is switched to the tracking servo by the continuous servo system to perform the corresponding tracking servo control. Therefore, the preferable searching operation is performed.

BRIEF DESCRIPTION OF THE DRAWINGS

The aforementioned aspects and other features of the invention are explained in the following description, taken in connection with the accompanying drawing figures wherein.

DETAILED DESCRIPTION OF THE PREFERRED EMBODIMENTS

The above and other objects and features of the present invention will become apparent from the following detailed description and the appended claims with reference to the accompanying drawings.

Figure 1:
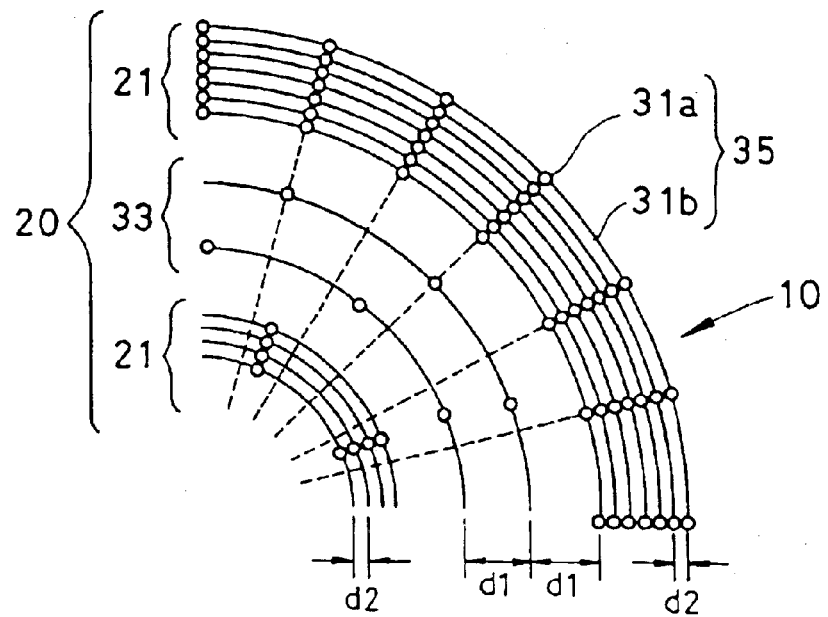
FIG. 1 is a diagram showing a recording surface of a conventional recording disc.
Figure 2:
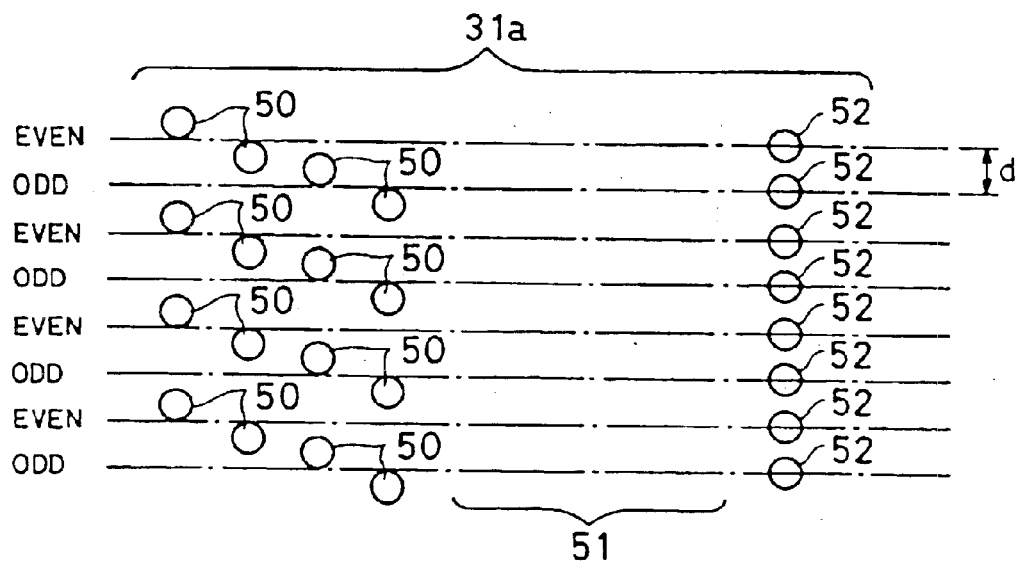
FIG. 2 is a diagram showing a servo area in the conventional recording disc.
Figure 3:
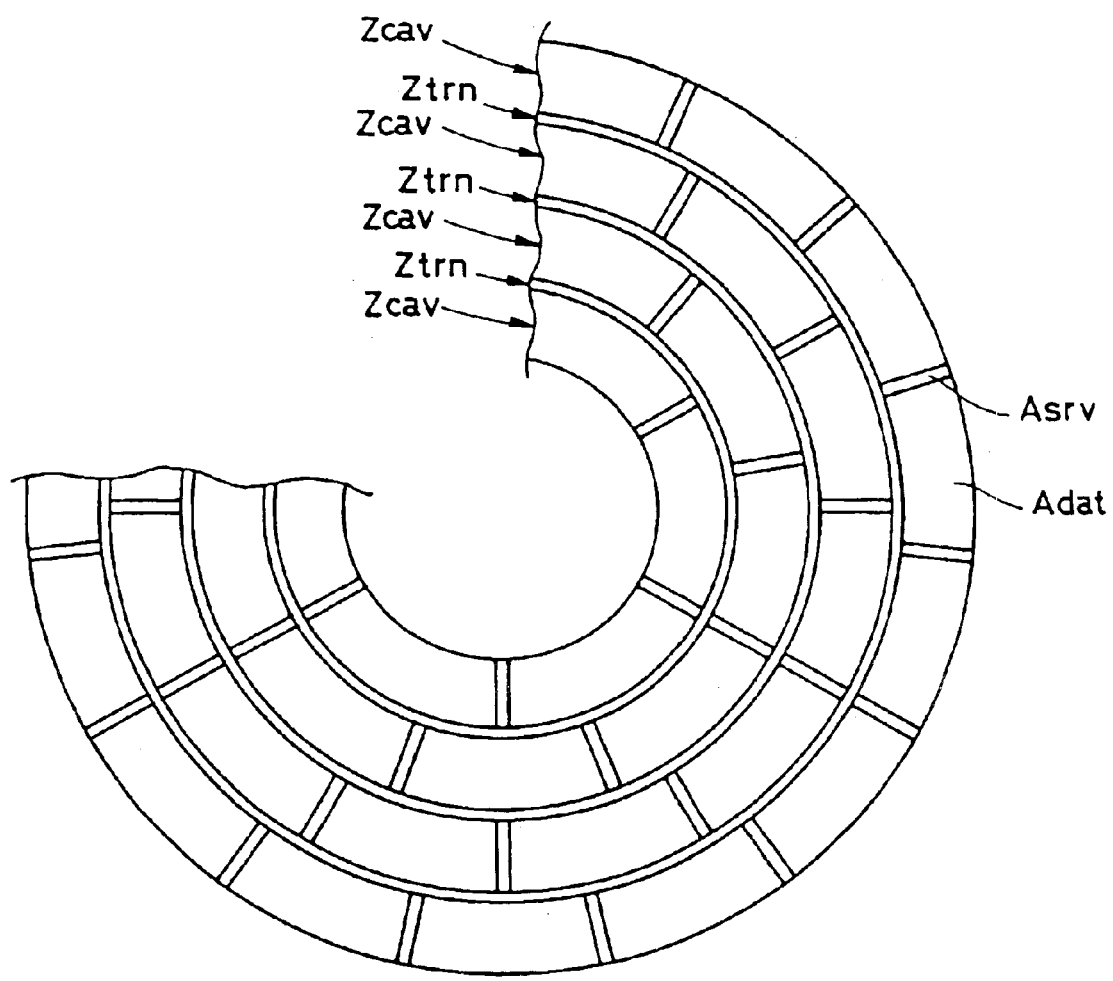
FIG. 3 is a diagram showing a schematic construction of a recording surface of a recording disc recorded by the ZCLV system.

FIG. 3 is a diagram showing a schematic construction of a recording surface of a recording disc according to the invention which utilizes the ZCLV system.

As shown in FIG. 3, the recording disc comprises a CAV zone $Z_{cav}$ and a transition zone $Z_{trn}$ concentrically arranged on a recording surface. The CAV zone $Z_{cav}$ is recorded or reproduced at a constant rotational angular velocity, i.e., using the CAV system. In the transition zone $Z_{trn}$, the rotational angular velocity changes.

The CAV zone $Z_{cav}$ includes a servo area $A_{srv}$ having reference pits recorded which is necessary for sync detection or a tracking servo, and a data area $A_{dat}$ for recording digital data. The servo areas and the data areas are alternately formed along the disc tangential direction. There is a predetermined integer number of servo areas $A_{srv}$ and a predetermined integer number of data areas $A_{dat}$ on a certain circumference of the disc. They are also radially aligned in the disc radial direction.

When the recording disc is recorded or reproduced along the radius of the disc, the recording or reproduction is performed at a constant rotational angular velocity in the CAV zone $Z_{cav}$. In the transition zone $Z_{trn}$ the rotational angular velocity is controlled so as to decrease as the laser beam spot moves toward the outer end of the disc. Consequently, a linear velocity for recording or reproduction is substantially constant. Because a data rate for the recording or reproduction is also constant, data is recorded or reproduced at an almost constant linear density over the entire disc.

As shown in FIG. 3, since a length of one circumference of the track is longer toward the outer end of the disc, the number of servo areas $A_{srv}$ and data area $A_{dat}$ is increasing in comparison with the number of data areas and servo areas adjacent the inner end.

Figure 4:
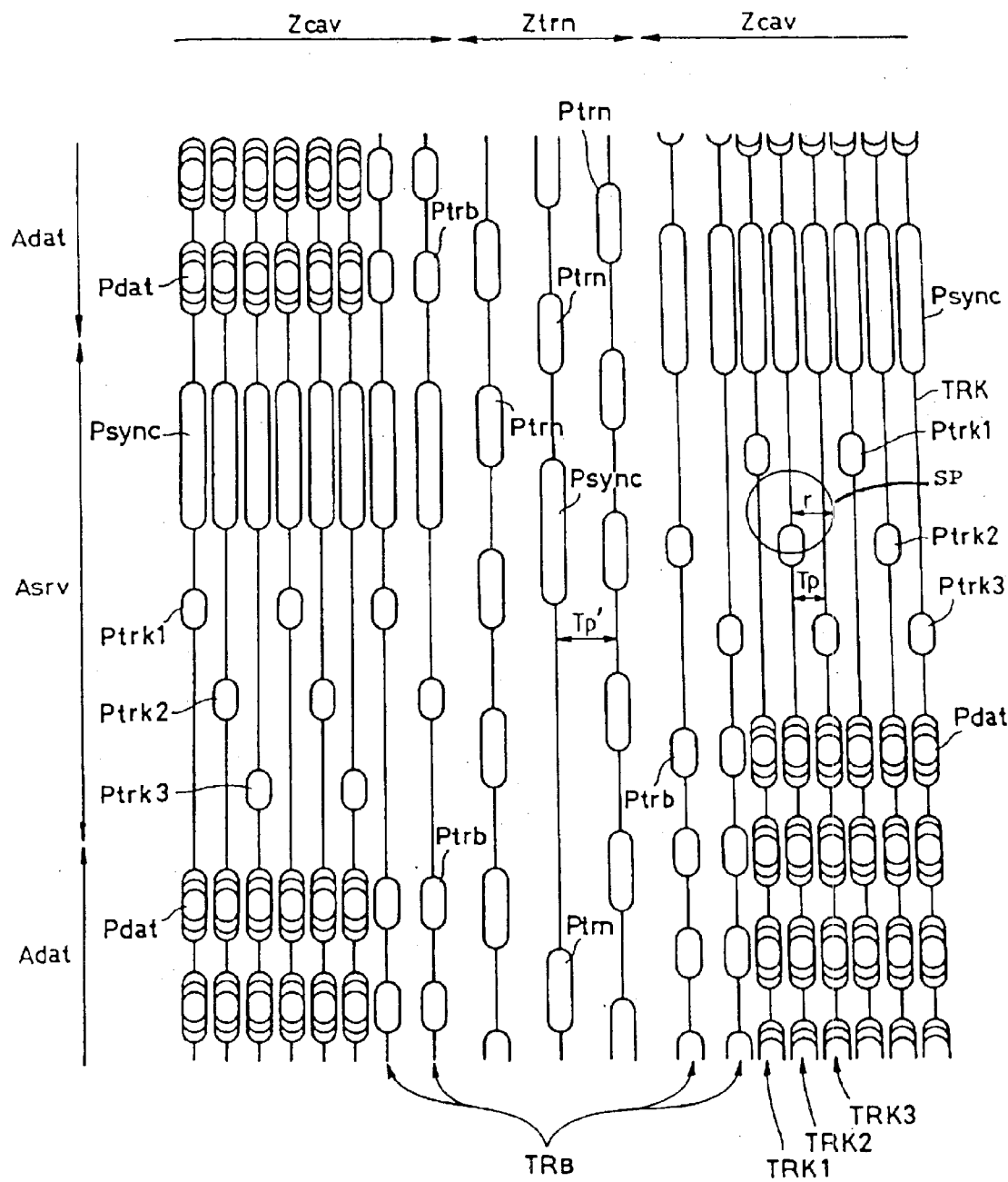
FIG. 4 is a diagram showing the recording surface of the recording disc shown in FIG. 3.

FIG. 4 is an enlarged view showing details of the recording surface of the recording disc. FIG. 4 shows a pit arrangement formed in two CAV zones $Z_{cav}$ and the transition zone $Z_{trn}$ between them.

In each CAV zone $Z_{cav}$ a plurality of pits formed in each of the servo area $A_{srv}$ and data area $A_{dat}$ are aligned in the disc radial direction. The servo area $A_{srv}$ has a sync pit $P_{sync}$ to detect synchronization and a tracking pit $P_{trk}$ to detect a tracking error. The tracking pit $P_{trk}$ is formed so that its center is located on the recording track. The data area $A_{dat}$ has a data pit $P_{dat}$ having digital data. The sync pit $P_{sync}$ has a longer pit length than of any data pits. The sync pit $P_{sync}$ is positioned at the same position in the disc tangential direction on all of the tracks in one servo area $A_{srv}$. The tracking pits $P_{trk}$, however, are located at positions which are away from $P_{sync}$ by a predetermined distance in the disc tangential direction every three tracks, as shown in FIG. 4. The data pits $P_{dat}$ are formed, for example, by using the SCIPER (Single Carrier Independent Pit Edge Recording) system. The SCIPER system comprises the steps of arranging a pit having a fixed length at predetermined intervals, and recording the pit so that the position of a forward pit edge and the position of a backward pit edge are respectively changed step by step in accordance with the recording data. For example, if the recording data is "0", the position of the pit edge is changed so as to reduce the pit length. If the recording data is "2", the position of the pit edge is changed so as to elongate the pit length and recording is performed. If the recording data is "1", the position of the pit edge is not changed. In this instance, three values of recording data of "0", "1", or "2" can be recorded to each of the pit edges. It should be noted that though FIG. 4 shows three positions where the pit edge can be positioned, the actual data pit $P_{dat}$ has only one of the three positions.

As shown in FIG. 4, in the CAV zone $Z_{cav}$, a track pitch $T_p$ is narrower than a radius r of a beam spot SP. Described below, if a tracking error is detected by using the tracking pits under the sampled servo system, the tracking servo can be performed even if the track pitch is narrowed as mentioned above.

In the transition zone $Z_{trn}$, a plurality of transition pits $P_{trn}$ having the same pit length are recorded at predetermined intervals. In this instance, in the transition zone $Z_{trn}$, although the sync pits $P_{sync}$ are provided as shown in FIG. 4, the tracking pits $P_{trk}$ and data pits $P_{dat}$ are not provided. That is, in the transition zone $Z_{trn}$ the data recording is not performed. In the transition zone $Z_{trn}$ a track pitch $T_p'$ is wider than the radius r of the beam spot SP. In the transition zone $Z_{trn}$ therefore, the tracking servo can be performed under the DPD (Differential Phase Detection) system.

As shown in FIG. 4, the sync pits $P_{sync}$ and tracking pits $P_{trk}$ are recorded on boundary tracks $TR_B$ existing at the boundaries adjacent to the transition zone $Z_{trn}$ among the tracks formed in the CAV zone $Z_{cav}$. A plurality of boundary pits $P_{trb}$ having the same pit length are recorded at predetermined intervals. This is because on the boundary track $TR_B$, although the tracking error is detected by using the tracking pits $P_{trk}$, a predetermined offset occurs in the tracking servo, since no tracking pit $P_{trk}$ exists on the adjacent tracks on the transition zone $Z_{trn}$ side.

As shown in FIG. 3, on the recording surface of the recording disc, the CAV zone $Z_{cav}$ occupies most of the area, and an area occupied by the transition zone $Z_{trn}$ is very small. In the CAV zone $Z_{cav}$, the data area $A_{dat}$ occupies most of the area, and the area occupied by the servo area $A_{srv}$ is very small.

The digital data can be, consequently, recorded onto most of the recording surface at a narrow track pitch and at a high density. In other words, as shown in FIGS. 3 and 4, a decrease in recording capacity due to the insertion of the transition zone $Z_{trn}$ and servo area $A_{srv}$ is very small. A fairly large effect is obtained by the increase in recording capacity due to the narrowing of the track pitch.

Figure 5:
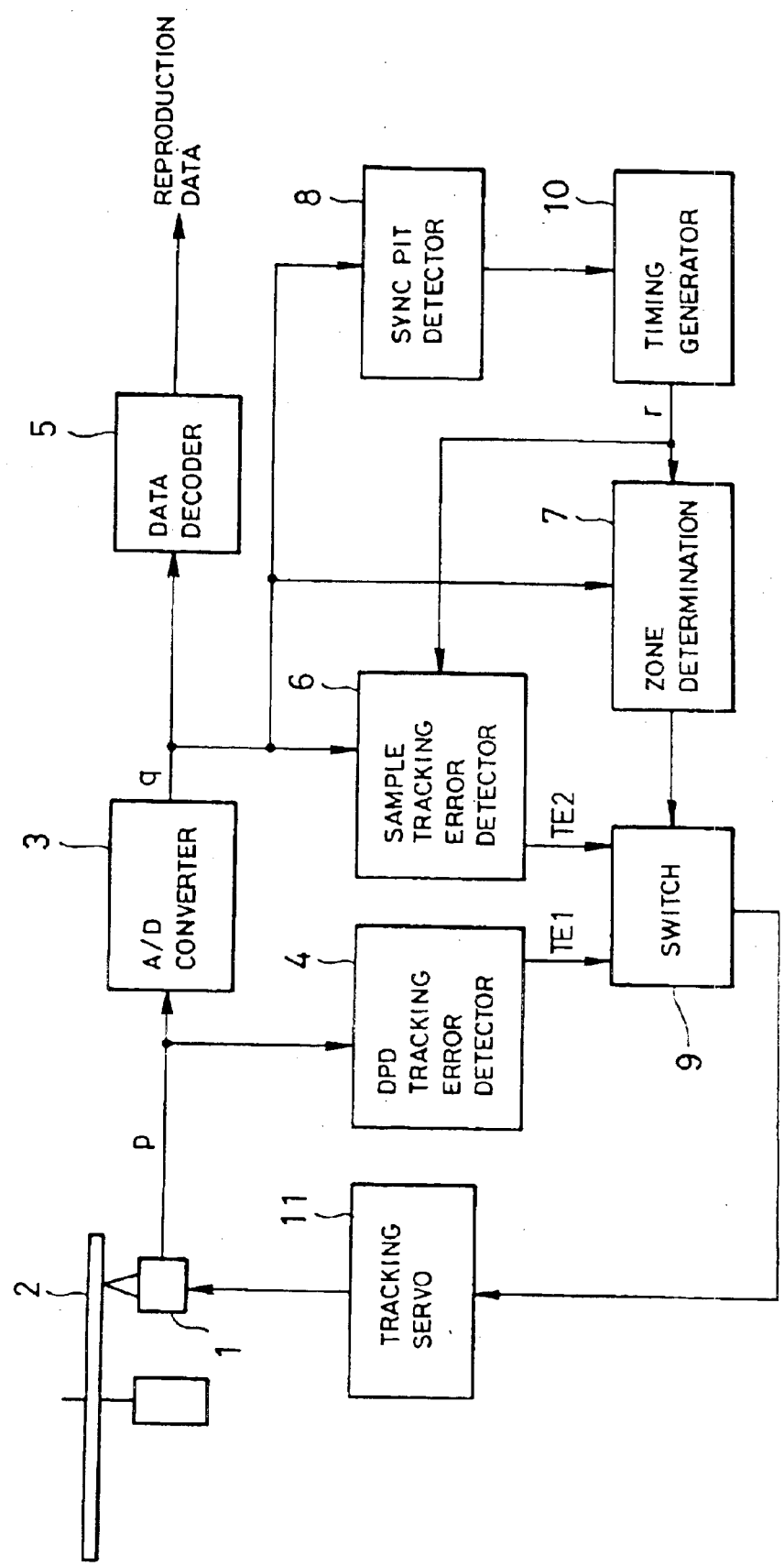
FIG. 5 is a block diagram showing a recording information reproducing apparatus of a first embodiment according to the invention.

FIG. 5 is a block diagram showing an apparatus for reproducing the recording information from the recording disc according to the present invention.

Figure 6:
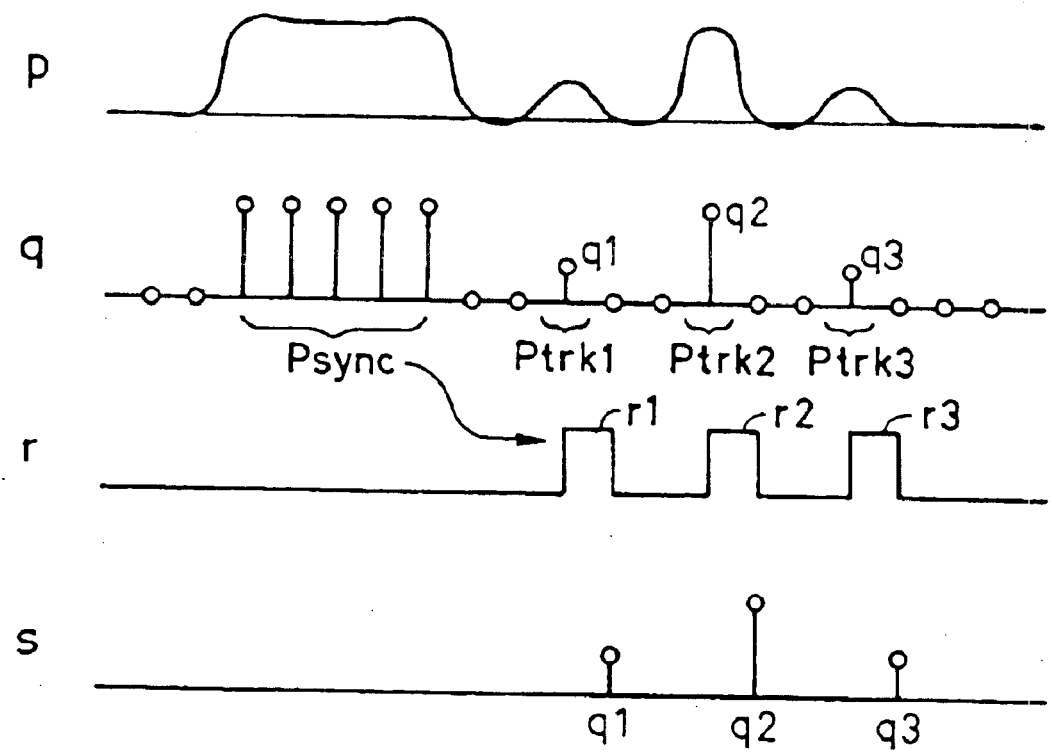
FIG. 6 is a view showing internal operation waveforms of the recording information reproducing apparatus shown in FIG. 5.

FIG. 6 is a diagram showing internal operation waveforms in the recording information reproducing apparatus when a beam spot SP emitting from a pickup 1 of the apparatus traces a recording track TRK2 in the servo area $A_{srv}$ shown in FIG. 4. In FIG. 6, it should be noted that when the apparatus reads a pit formed on the recording disc, its reading level increases.

Referring to FIG. 5, the pickup 1 irradiates a reading laser beam onto a recording disc 2 having the recording format shown in FIGS. 3 and 4 to form a beam spot SP as shown in FIG. 4. The pickup 1 photoelectrically converts a reflection light of the beam spot SP to obtain an analog read signal p, and supplies the read signal p to an A/D converter 3 and a DPD tracking error detector 4. The A/D converter 3 A/D-converts the read signal p with a clock signal (not shown) to generate a read sampling value q. The A/D converter 3 then supplies the resultant value q to each of a data decoder 5, a sample tracking error detector 6, a zone determination circuit 7, and a sync pit detector 8. The data decoder 5 decodes the digital data recorded on the recording disc 2 on the basis of the read sampling values q, and supplies the decoded data as reproduction data.

The sync pit detector 8 detects a long signal interval corresponding to the sync pit $P_{sync}$ among the read sampling values q to generate a sync detection signal, which is then supplied to a timing generating circuit 10. The timing generator 10 generates a timing signal r having the logic level "1" as shown in FIG. 6 at a read timing of each of the tracking pits $P_{trk1}$, $P_{trk2}$ and $P_{trk3}$ shown in FIG. 4 in response to the sync detection signal. The timing generator 10 then supplies the generated signal r to each of the sample tracking error detector 6 and zone determination circuit 7.

When the sampling value level corresponding to the tracking pit $P_{trk}$ is detected among the read sampling values q on the basis of the timing signal r, the zone determination circuit 7 determines that the recording information data is read out from the CAV zone $Z_{cav}$. If the sampling value level is not detected, the zone determination circuit 7 determines that the recording information data is read out from the transition zone $Z_{trn}$. The zone determination circuit 7 then supplies an area determination signal dependent on the determination to a switching circuit 9.

The DPD tracking error detector 4 detects a tracking error from the read signal p under a phase difference system to supply a tracking error signal TE1 corresponding to the detected tracking error to the switching circuit 9. In the phase difference system, a 4-split photoreceiver in the pickup receives a reflection light of the disc to add output signals of two photosensitive elements located in the diagonal direction among the four photoreceiver-units so as to obtain two sum signals. When the beam spot traces on the track, relative phases of the two sum signals change dependently on the positional relation between the track and the beam spot. Thus, the tracking error can be detected by detecting a phase difference between the two sum signals.

The sample tracking error detector 6 first extracts a sampling value q2 which is obtained when the tracking pit $P_{trk2}$ on the recording track TRK2 is read. The sample tracking error detector 6 then extracts a sampling value q1 which is a crosstalk component of the tracking pit $P_{trk}$ of the adjacent track TRK1. The sample tracking error detector 6 also extracts a sampling value q3 which is a crosstalk component of the tracking pit $P_{trk3}$ of the adjacent track TRK3. These values are selected among the obtained sampling values q in accordance with the timing signal r. These values are then set as extraction sampling values s. The sample tracking error detector 6 selects two sampling values among the extraction sampling values s except the largest value. The sample tracking error detector 6 then supplies a difference value between them as a tracking error signal TE2 to the switching circuit 9. For example, as shown in FIG. 6, sampling values q1 and q3 are selected, and the difference value therebetween becomes the tracking error signal TE2. That is, so long as the beam spot irradiated onto the recording disc correctly traces the track TRK2, the beam spot uniformly covers the tracking pits $P_{trk1}$ and $P_{trk3}$. In this embodiment, the sampling values q1 and q3 are equal, and the tracking error becomes zero. If the beam spot deviates to either one of the tracking pits, the sampling value q1 is not equal to the value q3, because the beam spot covers one of the tracking pit $P_{trk1}$ or $P_{trk3}$ more widely than the other. The differential value between q1 and q3 is equal to a value corresponding to the tracking error. With the above system, even if the track pitch $T_p$ in the CAV zone $Z_{cav}$ is set to be smaller than the radius of the beam spot, the tracking servo control can be performed, and the digital data can be correctly reproduced.

The switching circuit 9 alternatively selects one of a tracking error signal TE1 from the DPD tracking error detector 4 and a tracking error signal TE2 from the sample tracking error detector 6 in response to the area determination signal to supply the selected signal to a tracking servo circuit 11. That is, for a period in which the pickup 1 is tracing an area in the CAV zone $Z_{cav}$, the switching circuit 9 supplies a tracking error signal TE2 detected by the sample tracking error detector 6 to the tracking servo circuit 11. On the other hand, for a period in which the transition zone $Z_{trn}$ is being traced, the switching circuit 9 supplies a tracking error signal TE1 detected by the DPD tracking error detector 4 to the tracking servo circuit 11. The tracking servo circuit 11 moves the information reading position by the pickup 1 in the disc radial direction in response to the tracking error signal supplied from the switching circuit 9.

With the above construction, the tracking servo using the sampled servo system is executed for a period in which the pickup 1 traces an area in the CAV zone $Z_{cav}$. When the pickup 1 is shifted to the tracing of the area in the transition zone $Z_{trn}$ the control mode is automatically switched to the tracking servo by the phase difference system.

Even if the track jump destination at the time of search is in the area in the transition zone $Z_{trn}$, the preferable searching operation can be realized, because the tracking servo by the phase difference system is immediately performed.

In this embodiment, although the tracking servo by the phase difference system is executed at the time of tracing in the transition zone $Z_{trn}$, a tracking servo using the 3-beam system can be executed in place of the phase difference system.

Figure 7:
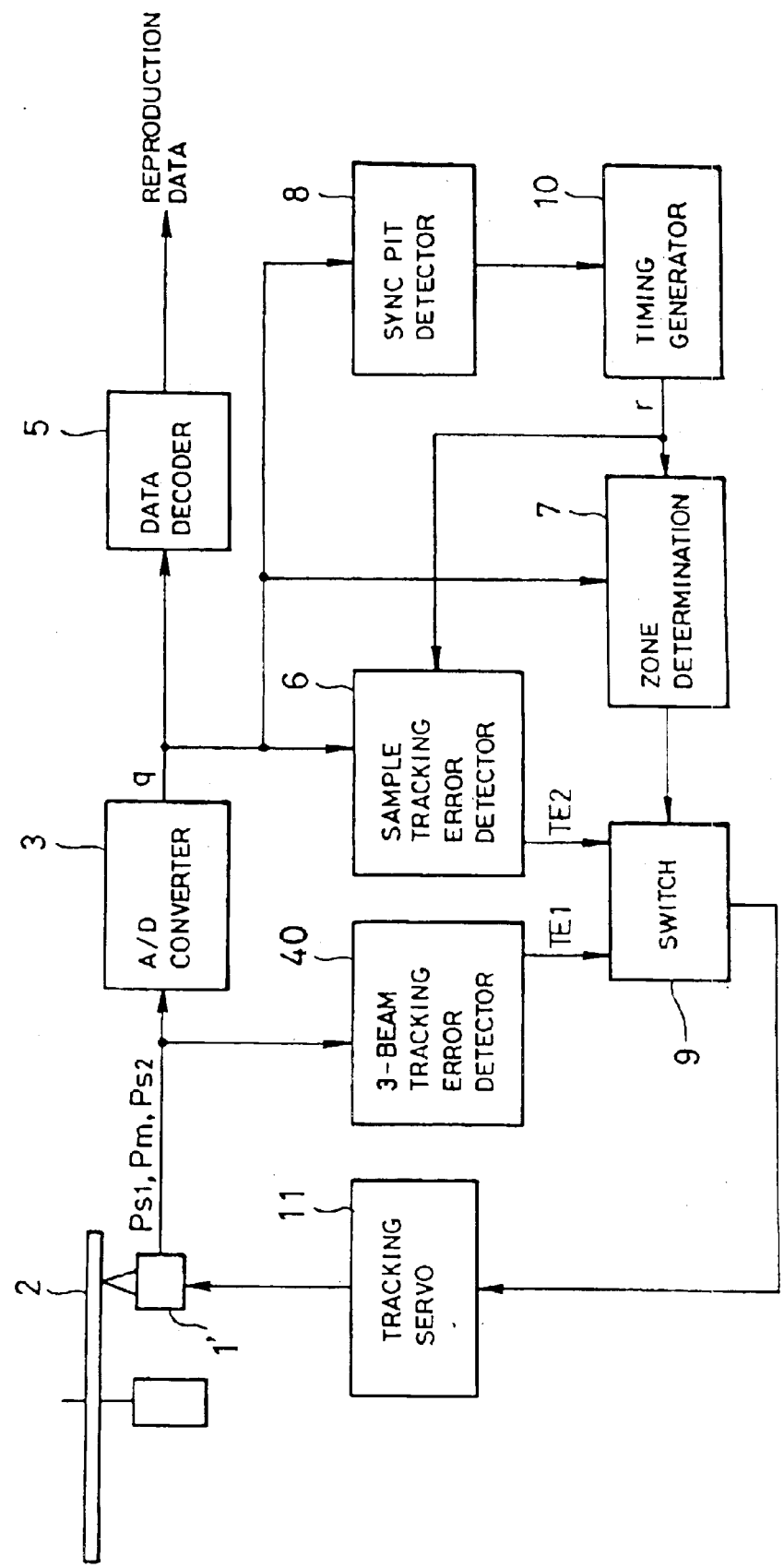
FIG. 7 is a block diagram showing a recording information reproducing apparatus of a second embodiment according to the invention.

FIG. 7 is a block diagram showing a second embodiment of a recording information reproducing apparatus according to the invention. In the recording information reproducing apparatus, recording information is read out by tracing the centerline of the two recording tracks formed adjacently on the recording disc.

Figure 8:
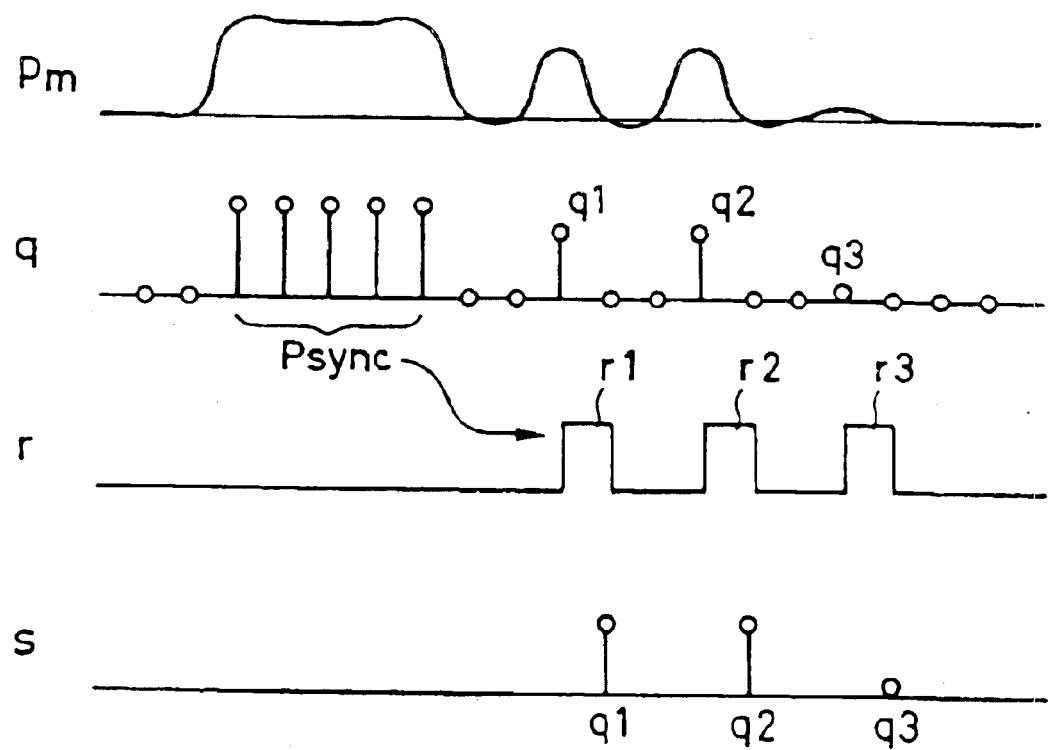
FIG. 8 is a diagram showing internal operation waveforms of the recording information reproducing apparatus shown in FIG. 7.
Figure 9:
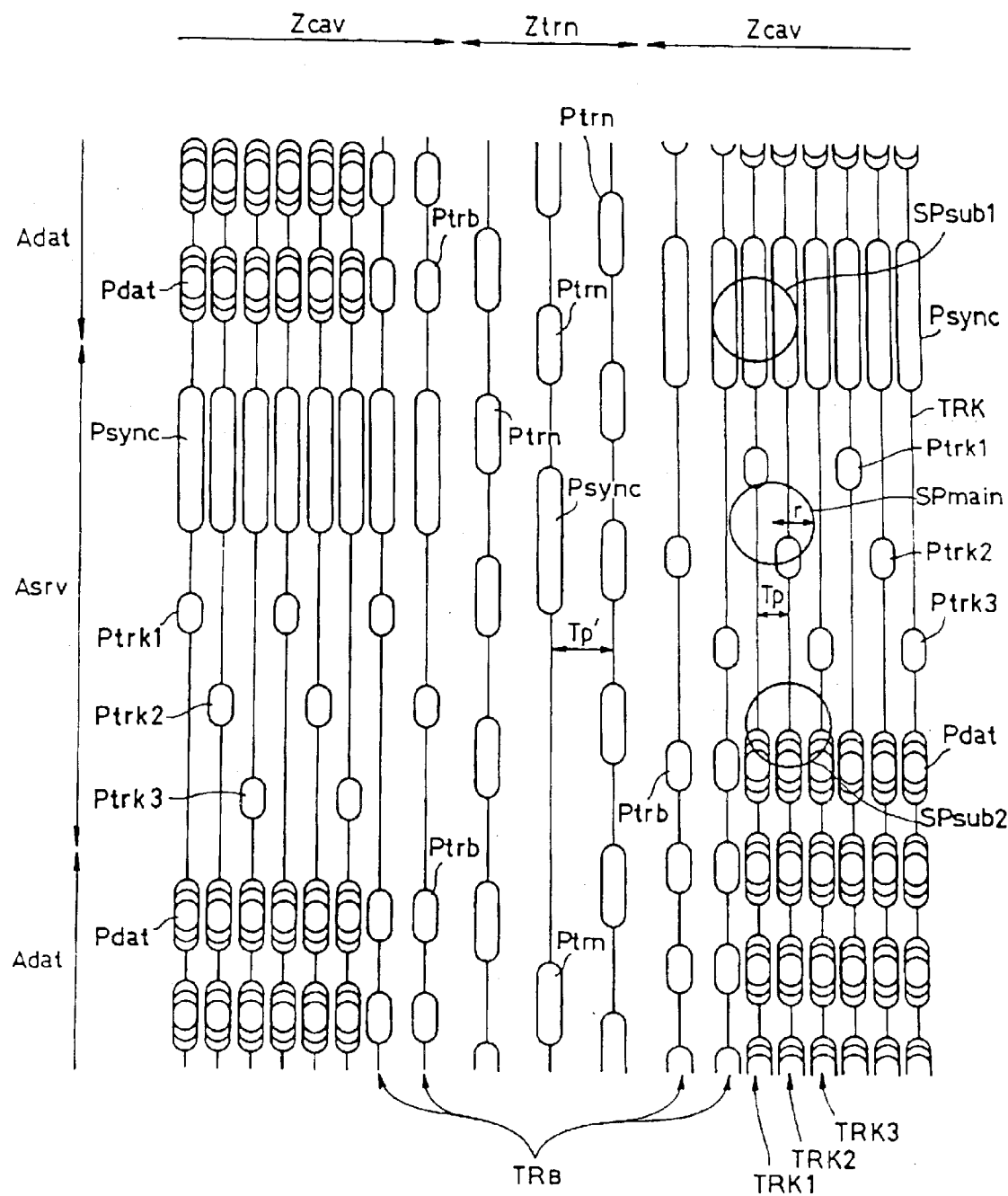
FIG. 9 is a diagram showing a recording surface irradiated by a beam spot generated by the recording information reproducing apparatus shown in FIG. 7.

FIG. 8 is a diagram showing internal operation waveforms which are obtained when three beam spots $SP_{sub1}$, $SP_{main}$, and $SP_{sub2}$ irradiated from a pickup 1' provided in the recording information reproducing apparatus trace a region in the servo area $A_{srv}$ as shown in FIG. 9. In FIG. 8, it is assumed that when the pickup reads the pit formed on the recording disc, the reading level from the pickup increases.

In FIG. 7, the pickup 1' irradiates three reading laser beams onto the recording disc 2 having the above recording format to form three beam spots $SP_{sub1}$, $SP_{main}$, and $SP_{sub2}$ on a recording surface of the recording disc 2 shown in FIG. 9. The pickup 1' photoelectrically converts the reflection light from each of the beam spots $SP_{sub1}$, $SP_{main}$ and $SP_{sub2}$ to obtain analog read signals $p_{s1}$, $p_m$, and $p_{s2}$. The A/D converter 3 A/D-converts the read signal $p_m$ by the clock signal (not shown) into a read sampling value q. The A/D converter 3 then supplies the resultant sampling value q to each of the data decoder 5, sample tracking error detector 6, zone determination circuit 7, and sync pit detector 8. The data decoder 5 decodes the digital data recorded on the recording disc 2 on the basis of the read sampling values q to generate the decoded data as reproduction data.

The sync pit detector 8 detects a long signal interval corresponding to the sync pit $P_{sync}$ from among the read sampling values q to generate a sync detection signal, which is then supplied to the timing generator 10. In response to the sync detection signal, the timing generator 10 generates the timing signal r having a logic level "1" as shown in FIG. 8 at a read timing of each of the tracking pits $P_{trk1}$, $P_{trk2}$, and $P_{trk3}$ shown in FIG. 9. The timing generator 10 then supplies the signal r to each of the sample tracking error detector 6 and zone determination circuit 7.

If the zone determination circuit 7 detects the sampling value level corresponding to the tracking pit $P_{trk}$ from among the reading sampling values q at a timing responsive to the timing signal r, the zone determination circuit 7 determines that the recording information is read out from the CAV zone $Z_{cav}$. If the zone determination circuit 7 does not detect the sampling value level, the zone determination circuit 7 determines that the recording information is read out from the transition zone $Z_{trn}$. The zone determination circuit 7 then supplies an area determination signal according to a determination result to the switching circuit 9.

A 3-beam tracking error detector 40 detects a tracking error on the basis of the read signals $p_{s1}$ and $p_{s2}$ by the 3-beam system to supply the tracking error signal TE1 corresponding to the detected tracking error to the switching circuit 9. In the 3-beam system, The 3-beam tracking error detector 40 calculates a difference between the average level of the read signals $p_{s1}$ and $p_{s2}$ to detect the calculated value as a tracking error. When the beam spot traces on the track, the average level of the read signals which are obtained from the two beam spots $SP_{sub1}$ and $SP_{sub2}$ changes dependent on the positional relation between the track and the beam spot. Thus, the tracking error can be detected by obtaining a difference between the average levels.

The sample tracking error detector 6 first extracts the sampling values q1–q3 which are obtained at the read timings of the tracking pits $P_{trk1}$–$P_{trk3}$ from the reading sampling values q in response to the timing signal r, respectively. The sample tracking error detector 6 then sets the extracted values as the extraction sampling values s. The sample tracking error detector 6 then selects the two largest of the extraction sampling values to generate a difference value between the two largest values as a tracking error signal TE2, which is then supplied to the switching circuit 9. For example, in FIG. 8, sampling values q1 and q2 are selected and the difference value between q1 and q2 is a tracking error signal TE2. That is, so long as the beam spot irradiated onto the recording disc correctly traces the centerline between the tracks TRK1 and TRK2, the beam spot uniformly covers the tracking pits $P_{trk1}$ and $P_{trk2}$ so that the sampling values q1 and q2 are equal, and the tracking error becomes zero. If the beam spot is offset from the centerline, the sampling values q1 and q2 are not equal and the difference between q1 and q2 is equal to a value corresponding to the tracking error, because the beam spot covers one of the tracking pit $P_{trk1}$ or $P_{trk2}$ more widely than the other. With the above system, even if the track pitch $T_p$ in the CAV zone $Z_{cav}$ is set to be smaller than the radius of the beam spot, the tracking servo can be performed and the digital data can be correctly reproduced.

The switching circuit 9 alternatively selects one of the tracking error signal TE1 from the 3-beam tracking error detector 40 or the tracking error signal TE2 from the sample tracking error detector 6 in accordance with the area determination signal to supply the selected signal to the tracking servo circuit 11. That is, for a period in which the pickup 1 is tracing an area in the CAV zone $Z_{cav}$, the switching circuit 9 supplies the tracking error signal TE2 detected by the sample tracking error detector 6 to the tracking servo circuit 11. On the other hand, for a period in which the transition zone $Z_{trn}$ is traced, the switching circuit 9 supplies the tracking error signal TE1 detected by the 3-beam tracking error detector 40 to the tracking servo circuit 11. The tracking servo circuit 11 deviates the information reading position by the pickup 1 in the disc radial direction in response to the tracking error signal supplied from the switching circuit 9.

According to the construction shown in FIG. 7, the tracking servo by the sampled servo system as mentioned above is executed for a period in which the pickup 1 is tracing the area in the CAV zone $Z_{cav}$. When the pickup 1 is shifted to the tracing of the area in the transition zone $Z_{trn}$ the control mode is automatically switched to the tracking servo by the 3-beam system.

The tracking error detecting system at the time of tracing the area in the transition zone $Z_{trn}$ is not limited to the DPD system and 3-beam system. Thus, the push-pull system can be used. The push-pull system includes a photosensitive element divided into two portions in the disc radial direction, and a difference between outputs of the two photosensitive portions is used as a tracking error.

That is, in the invention, upon tracing of the area in the transition zone $Z_{trn}$, the tracking error detection by using a continuous servo system such as the DPD system, 3-beam system, or push-pull system is executed.

It should be understood that this invention is not limited to the SCIPER system mentioned above but can be further applied to a recording disc on which digital data is recorded by using a run length encoding system like a DVD or a CD. It is still in the scope of the invention to be applicable to a recording disc on which digital data is recorded by using the pit position recording system in which binary data is expressed with pits.

It should be understood that though the zone determination circuit 7 in the above embodiment detects the sampling value level corresponding to the tracking pit $P_{trk}$ among the read sampling values q to determine whether the area being read is the CAV zone $Z_{cav}$ or transition zone $Z_{trn}$, any suitable area determination method can be used. It is within the scope of the invention to record a pit for the area determination in only one of the areas. It is also within the scope of the invention to multiplex area discrimination data into the recording data and to extract the discrimination data from the reproduction data for determining the area. It is also within the scope of the invention to detect an address indicating a position on the disc recording surface from the reproduction data and to determine the area in accordance with the address. It is still within the scope of the invention to determine an area, by monitoring an amplitude of a tracking error under the DPD system or the 3-beam system. It is still within the scope of the invention to determine an area by setting the length of a pit $P_{trn}$ of the transition zone to be longer than that of a data pit of the CAV zone $Z_{cav}$ and monitoring an amplitude of the read signal p or the read sampling value q.

In the above preferred embodiment, the period of a tracking pit is three times as long as that of a track. It should be noted that the period of the tracking pit can be two times as long as that of a track, or four or more times as long as that of a track.

It is understood that the foregoing description and accompanying drawings set forth the preferred embodiments of the invention at the present time. Various modifications, additions and alternatives will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A recording disc for recording information data on a recording surface, said disc comprising:
    a first area including a plurality of recording tracks arranged at a track pitch smaller than a beam radius of a reading light beam, said reading light beam being irradiated onto a recording surface to read recording information data, and
    a second area including a plurality of recording tracks arranged at a track pitch larger than said beam radius, wherein said first area and said second area are concentrically alternatively located.

2. A disc according to claim 1, wherein only said first area includes a data pit indicating information data.

3. A disc according to claim 2, wherein a boundary track adjacent to said second area includes none of said data pit, said boundary track being one of said plurality of the recording tracks in said first area.

4. A disc according to claim 3, further comprising a plurality of pit having substantially equal pit lengths on said boundary tracks, said pits being arranged at a predetermined interval.

5. A disc according to claim 1, further comprising a plurality of pits having substantially equal pit lengths, said pits being arranged at a predetermined interval on said plurality of recording tracks in said second area.

* * * * *